United States Patent [19]

McMurtre

[11] Patent Number: 5,014,351

[45] Date of Patent: May 7, 1991

[54] METHOD AND APPARATUS FOR REDUCING ALTERNATOR NOISE

[75] Inventor: Hugene McMurtre, Fort Worth, Tex.

[73] Assignee: Motorola, Inc., Schaumburg, Ill.

[21] Appl. No.: 610,738

[22] Filed: Nov. 9, 1990

Related U.S. Application Data

[63] Continuation of Ser. No. 361,153, Jun. 5, 1989, abandoned.

[51] Int. Cl.$^5$ .............................................. H04B 1/10
[52] U.S. Cl. ..................................... 455/297; 455/238
[58] Field of Search ............... 455/238, 297, 345, 298, 455/291, 303–305; 381/86, 57, 107

[56] References Cited

U.S. PATENT DOCUMENTS

| 3,599,142 | 8/1971 | Rust | 455/297 |
| 4,081,740 | 3/1978 | Teratani et al. | 455/297 |
| 4,864,246 | 9/1989 | Kato et al. | 455/238 |

FOREIGN PATENT DOCUMENTS 2719392  11/1977  Fed. Rep. of Germany ...... 455/297

Primary Examiner—Curtis Kuntz
Attorney, Agent, or Firm—Juliana Agon

[57] ABSTRACT

A phase shifted (28) version of an alternator noise signal (26) is coupled into a recovered signal (22) that has been corrupted by the alternator noise. The alternator noise signal (26), and phase shifted version thereof, add to zero (or near zero) so as to reduce alternator noise corruption of the recovered signal.

7 Claims, 1 Drawing Sheet

METHOD AND APPARATUS FOR REDUCING ALTERNATOR NOISE

This is a continuation of application Ser. No. 07/361,153, filed June 5, 1989, and now abandoned.

TECHNICAL FIELD

This invention relates generally to two-way communication devices designed to be installed in vehicles (mobile radios), and more specifically to a method and apparatus for preventing alternator noise from corrupting the signals received by mobile radios.

BACKGROUND ART

Mobile two-way radios are generally understood to be those radios designed to be installed in vehicles. Police, Fire, Taxi, and other groups rely daily upon these radios to provide communication with others in the performance of their various duties. One problem that impacts the effectiveness (or quality) of the communications is alternator noise. Alternators produce a time-varying signal that is used to recharge the vehicle's battery. This time-varying signal may be coupled into the mobile radio either via conductive or radiated phenomenon, and corrupt the signals received by the mobile radio. Accordingly, a need exists to reduce or eliminate alternator noise so as to improve mobile radio communications.

SUMMARY OF THE INVENTION

Accordingly, it is an object of the present invention to reduce alternator noise coupling into a received signal.

Briefly, according to the invention, a phase shifted version of the alternator noise is coupled into a recovered signal that has been corrupted by alternator noise. The alternator noise, and phase shifted version thereof, add to zero (or near zero) so as to reduce alternator noise corruption of the recovered signal.

BRIEF DESCRIPTION OF THE DRAWINGS

The Drawing FIGURE is a block diagram of a two-way mobile radio in accordance with the present invention.

DETAILED DESCRIPTION OF THE PREFERRED EMBODIMENT

Figure 1:
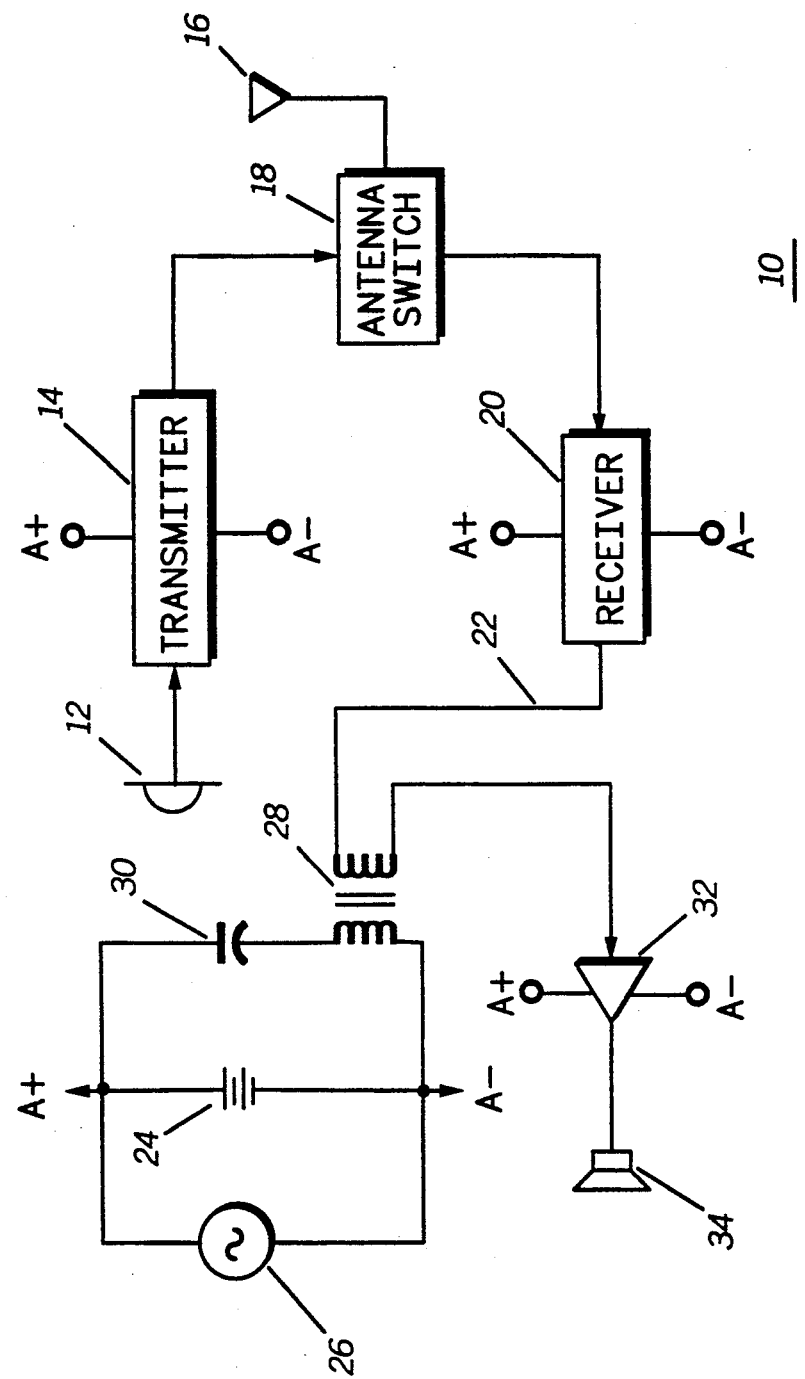

Referring to the Drawing FIGURE, a mobile radio 10 transmits signals impressed upon a microphone 12 via a transmitter 14. While transmitting, an antenna 16 is selectively coupled to the transmitter 14 via an antenna switch 18.

To receive an information signal (voice or data), the antenna 16 is coupled (18) to a receiver 20, which provides a recovered signal 22. Since the receiver 20 receives power from the vehicle's battery 24, it is possible for a time-varying signal 26 generated by the vehicle's alternator to corrupt the received signal during the processing necessary to provide the recovered signal. Additionally, depending upon the physical implementation of the radio 10, it is possible for the time-varying signal 26 to be electromagnetically coupled into the received or recovered signal causing these signals to be corrupted. In any event, the conductive or radiated interference resulting from the alternator signal reduces the effectiveness (or quality) of communications by corrupting the information signals received by the radio 10.

According to the invention, this corruption is reduced or eliminated by coupling or injecting a phase shifted version of the alternator signal 26 into the already recovered signal 22. This may be done either before or after the point of actual corruption of the recovered signal, since, in either event, the combination of the alternator signal, and the phase shifted version thereof, preferably add to zero (or near zero) so as to reduce (or eliminate) the alternator noise in the recovered signal. To do this, the present invention incorporates the primary side of a transformer 28 in series with a filtering capacitor 30. The secondary of the transformer 28 couples (or injects) a 180° phase shifted version of the time-varying signal 26 into the recovered signal 22, which is routed through the secondary of the transformer 28. Preferably, the alternator noise signal 26 and the phase shifted version thereof add to zero (or near zero) prior to an audio amplifier 32 which presents the recovered signal to the radio's operator via a speaker 34. In this way, the alternator noise signal itself provides the means by which alternator noise is reduced (or eliminated) from the recovered signal.

What is claimed is:

1. A method for reducing alternator noise in a received signal, comprising the steps of:
    (a) receiving a signal to provide a received signal;
    (b) processing the received signal to provide a recovered audio signal, the recovered audio signal being at least partially corrupted by a low frequency alternator noise signal;
    (c) injecting a phase shifted version of the low frequency alternator noise signal by a transformer into the recovered audio signal.

2. The method of claim 1, wherein step (c) further comprises injecting a 180° phase shifted version of the alternator noise signal into the recovered signal.

3. The method of claim 1 wherein step (c) comprises coupling a phase shifted version of the alternator noise signal into the recovered signal.

4. The method of claim 3, wherein step (c) further comprises coupling a 180° phase shifted version of the alternator noise signal into the recovered signal.

5. A method for reducing alternator noise in a received signal, comprising the steps of:
    (a) receiving a signal to provide a received signal;
    (b) processing the received signal to provide a recovered audio signal, the recovered audio signal being at least partially corrupted by a low frequency alternator noise signal;
    (c) coupling a 180° phase shifted version of the low frequency alternator noise signal by a transformer into the audio recovered signal.

6. A radio capable of transmitting and receiving information signals, comprising,
    transmitter means for transmitting a signal;
    receiver means for receiving an information signal to provide a received signal;
    processing means for processing the received signal to provide a recovered audio signal, the recovered audio signal being at least partially corrupted by a low frequency alternator noise signal;
    a transformer for coupling a phase shifted version of the low frequency alternator noise signal into the recovered audio signal.

7. The radio of claim 6, wherein said transformer comprises:
    a primary coil of said transformer in series with a capacitor; said primary coil and said capacitor connected in parallel with said alternator noise signal; and
    a secondary coil of said transformer in series with said recovered signal.

* * * * *